United States Patent [19]

Peng

[11] Patent Number: 5,663,550
[45] Date of Patent: Sep. 2, 1997

[54] MULTIPLE-DIRECTIONAL LASER SCANNERS

[75] Inventor: Ke-Ou Peng, KV Delft, Netherlands

[73] Assignee: Opticon Sensors Europe B.V., Hoofddorp, Netherlands

[21] Appl. No.: 386,360

[22] Filed: Feb. 9, 1995

[30] Foreign Application Priority Data

Feb. 9, 1994 [GB] United Kingdom ............... 9402506
Aug. 16, 1994 [GB] United Kingdom ............... 9416575

[51] Int. Cl.$^6$ .................................................. G06K 7/10
[52] U.S. Cl. .................................... 235/467; 235/472
[58] Field of Search .................................. 235/467, 472

[56] References Cited

U.S. PATENT DOCUMENTS 4,230,393  10/1980  Burke, Jr. .
4,282,431   8/1981  Anthony .................... 235/467
4,838,632   6/1989  Manian .
4,871,904  10/1989  Metlitsky et al. .

FOREIGN PATENT DOCUMENTS 0 456 095  11/1991  European Pat. Off. .
0 551 666   7/1993  European Pat. Off. .
2255650    11/1992  United Kingdom .

Primary Examiner—Harold Pitts
Attorney, Agent, or Firm—Nixon & Vanderhye P.C.

[57] ABSTRACT

An optical scanner for a bar code reader has a rotary driving motor which drives a carrier to rotate about a principal axis, the carrier carries mirror means which is pivoted about a scan axis at right angles to the carrier axis, and force applying means is arranged to apply a turning couple to the mirror to cause it to turn to provide the scan motion while the carrier rotates to change the scan orientation. The timing couple is provided either by being coupled to the drive from the rotary carrier or by means of an axially mounted electromagnetic coil.

12 Claims, 12 Drawing Sheets

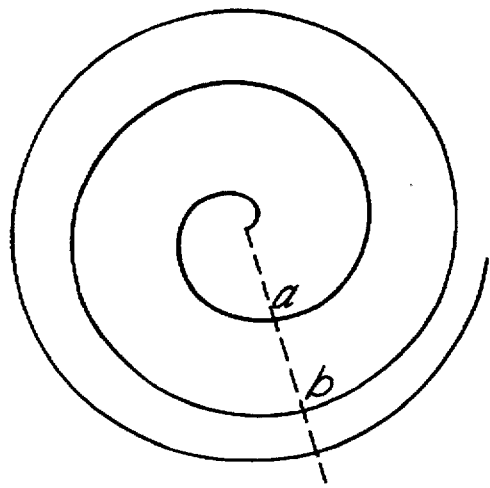
FIG.2d.
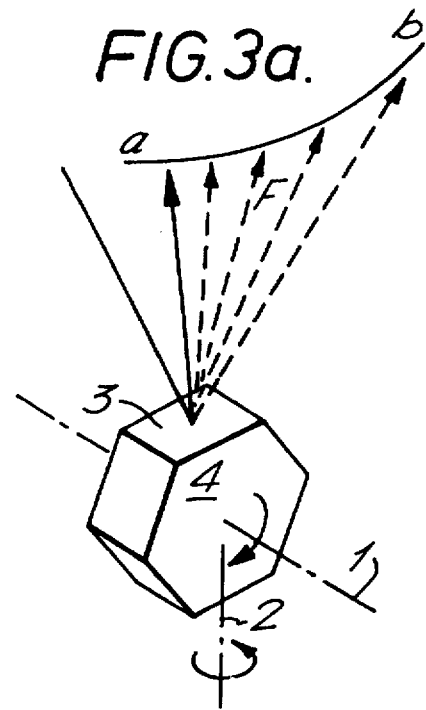
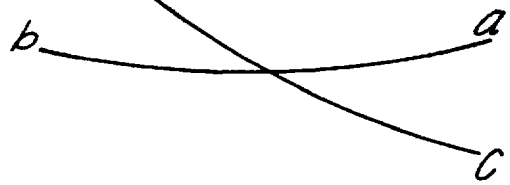
FIG.3b.
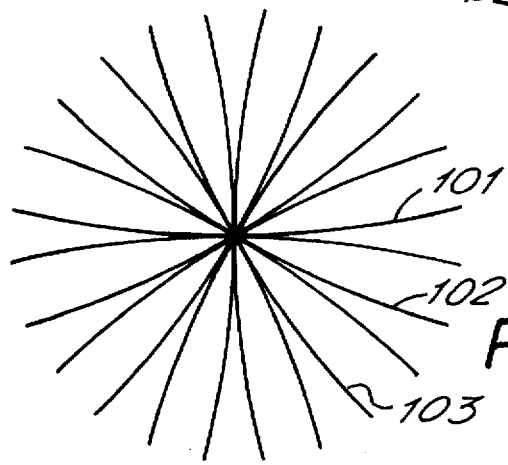
FIG.3c.

FIG.5a.
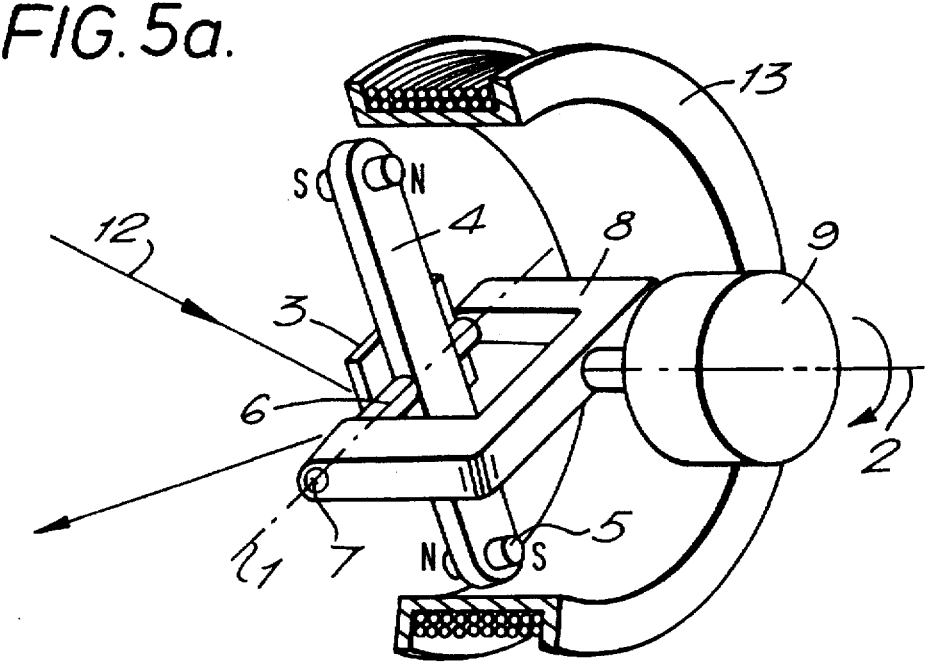
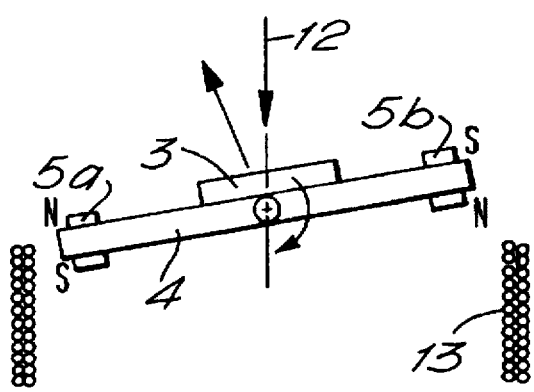
FIG.5b.
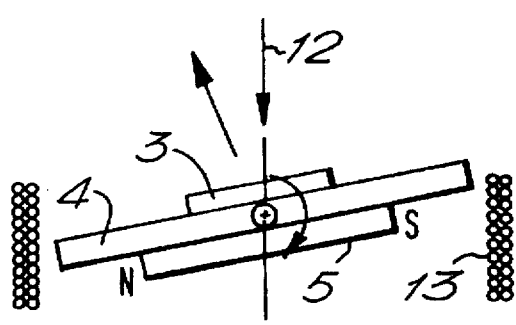
FIG.5c.

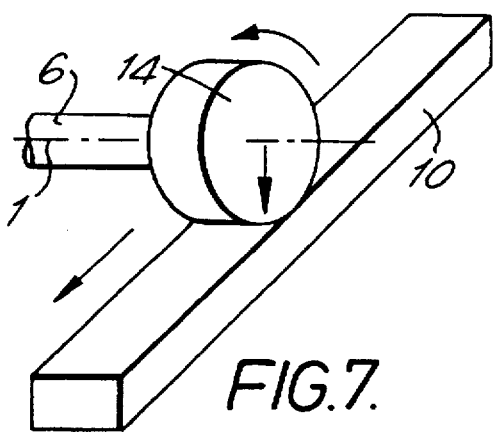
FIG.7.
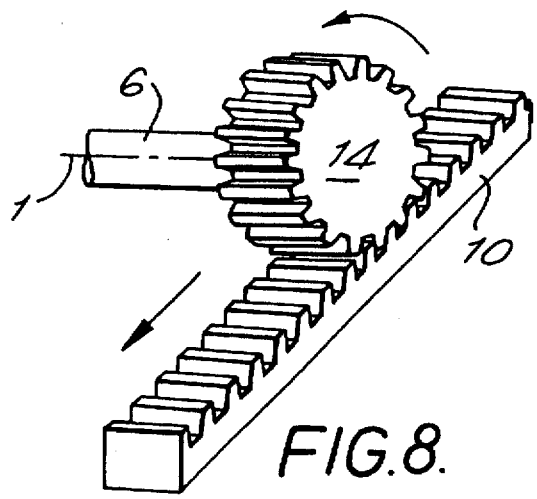
FIG.8.
FIG.9.
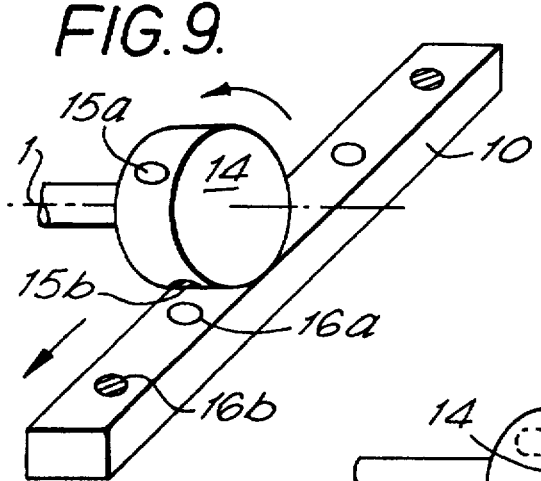
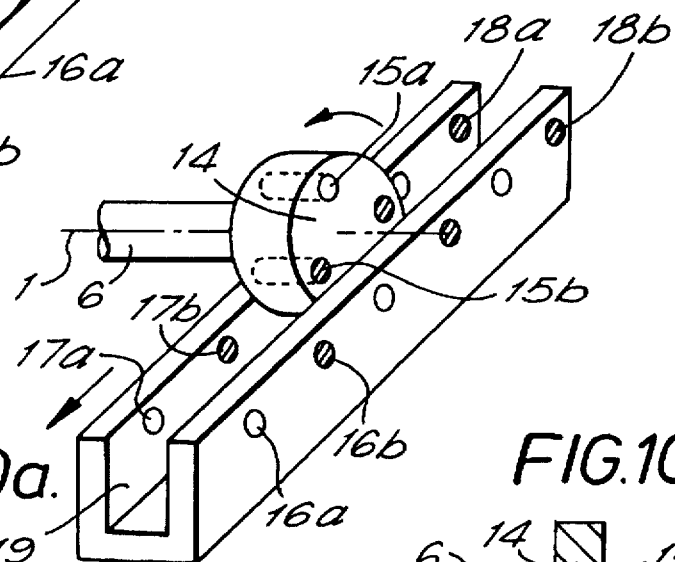
FIG.10a.
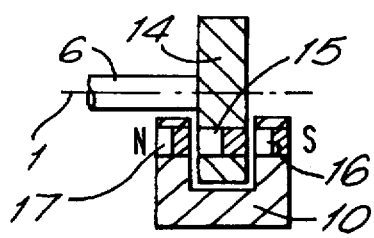
FIG.10b.

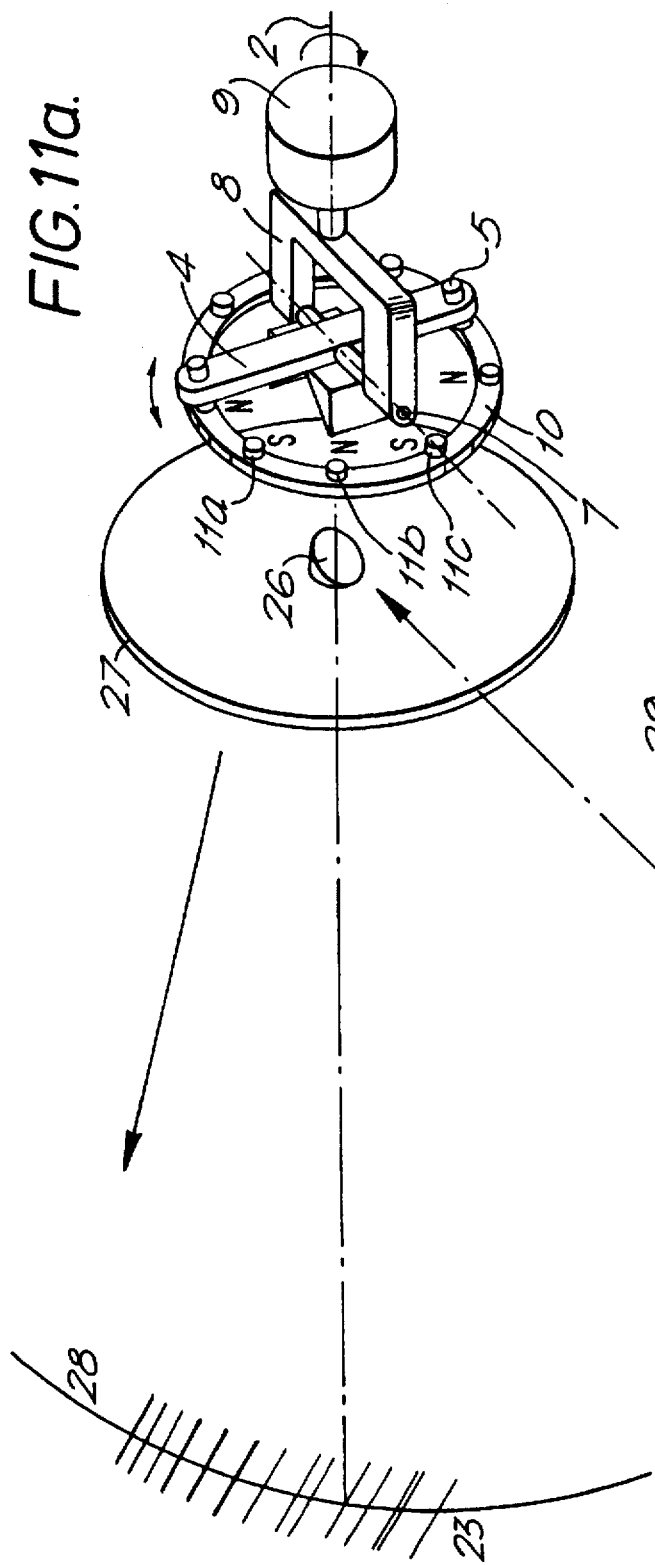
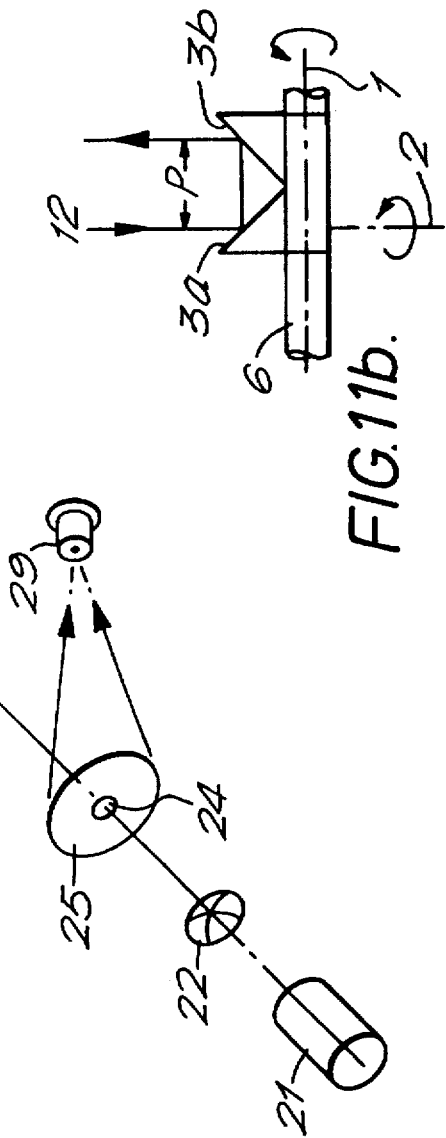

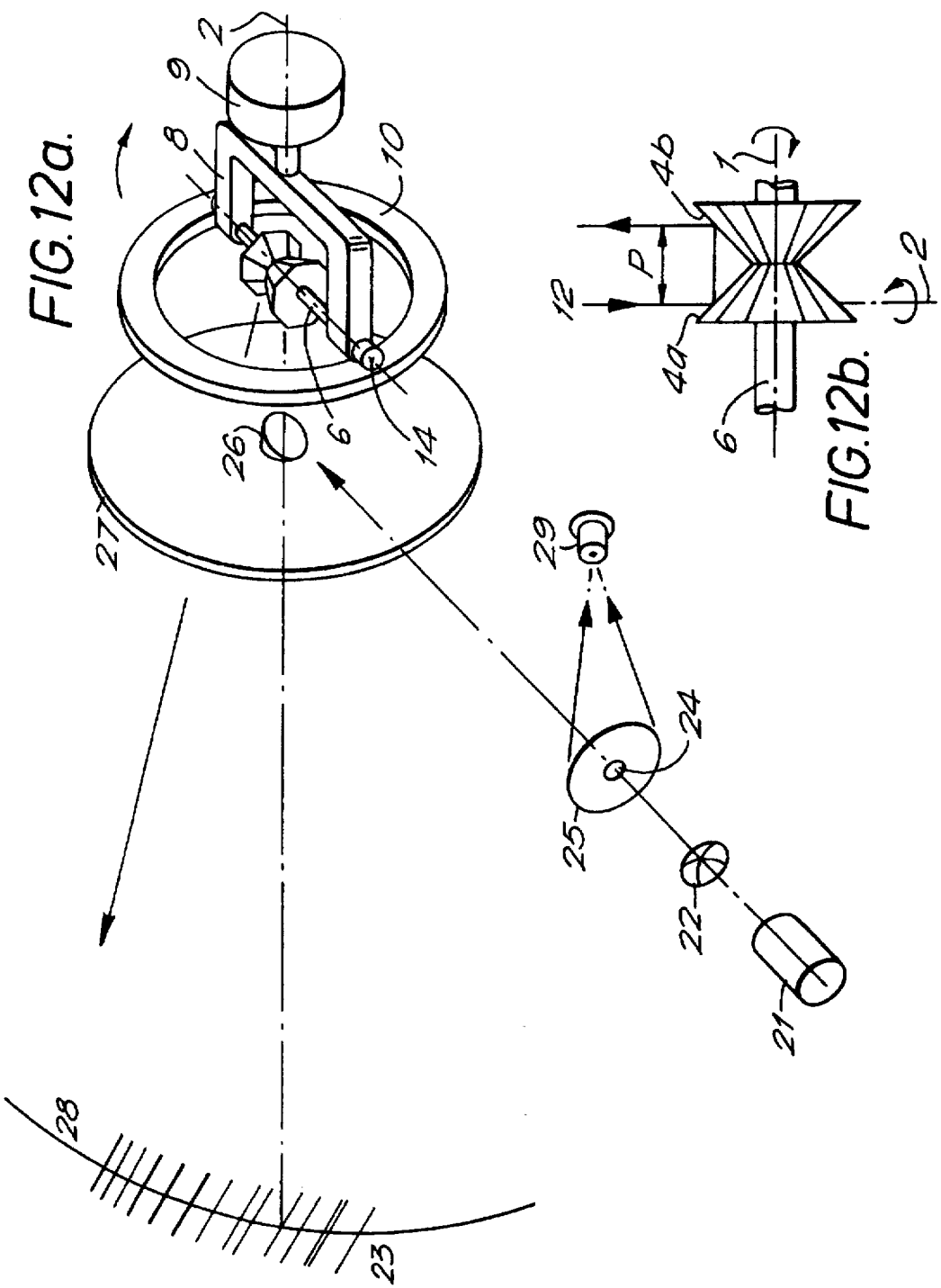

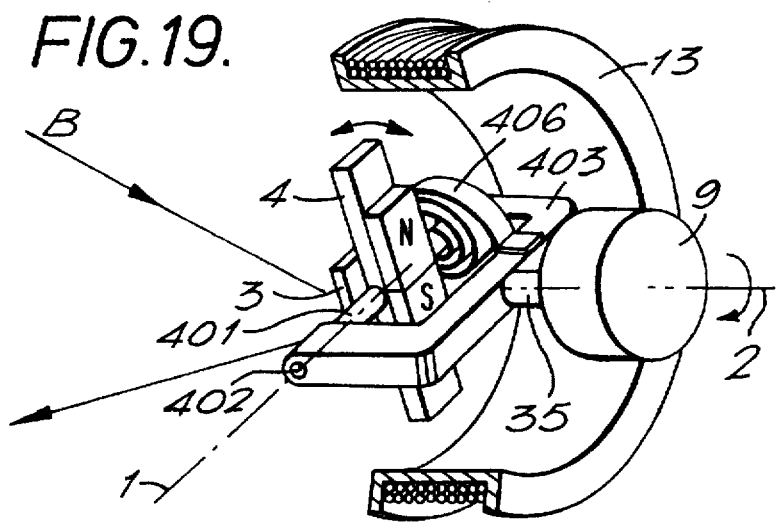
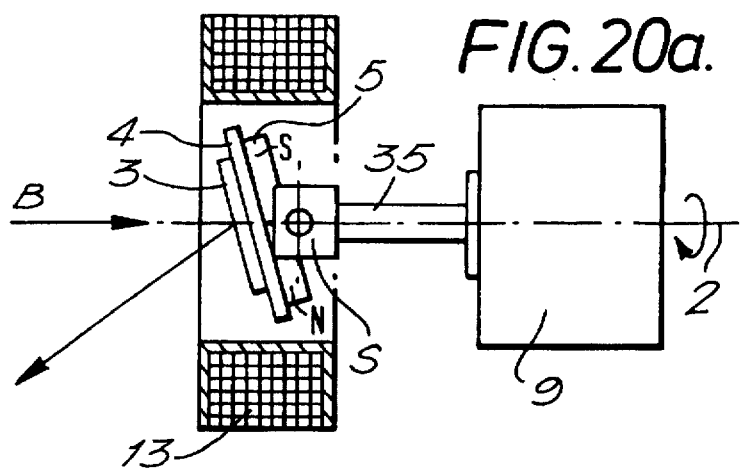
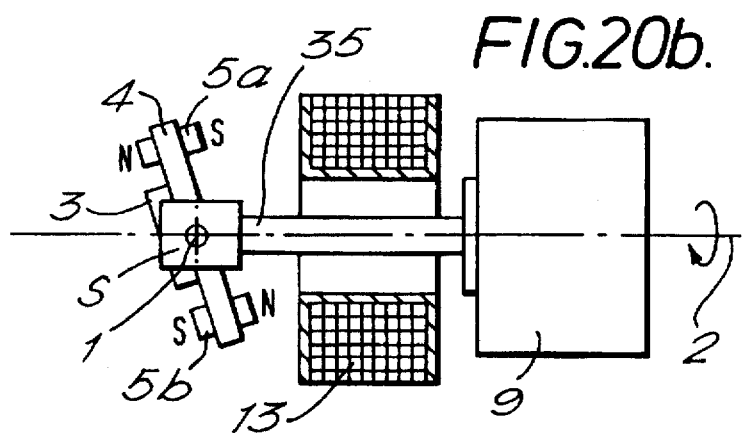

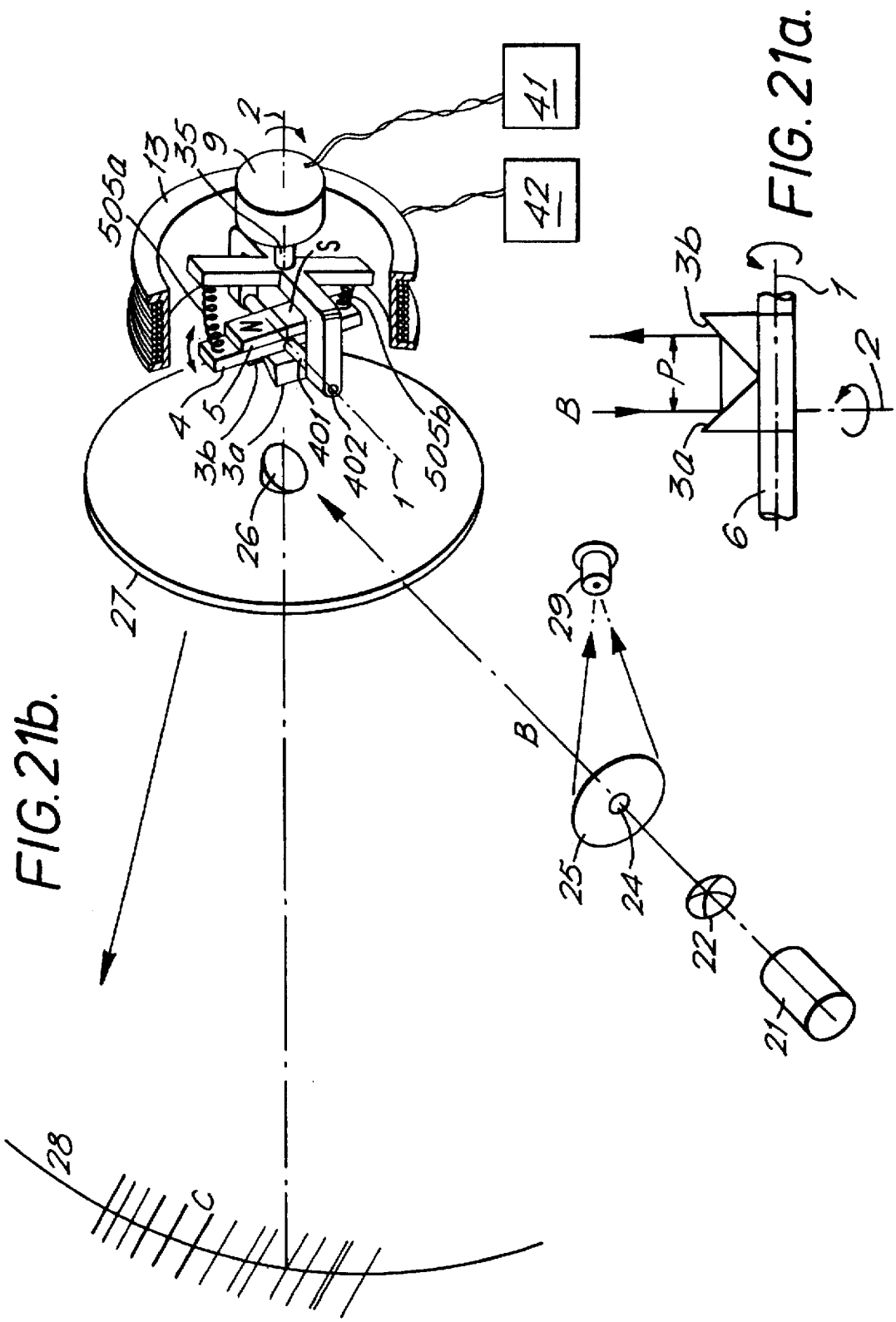

MULTIPLE-DIRECTIONAL LASER SCANNERS

BACKGROUND TO THE INVENTION

1. Field of the Invention

The invention relate to bar code readers, and more particularly to bar code readers of the kind where a beam of light, such as a laser beam, is caused to scan a bar code so that reflected light as a series of pulses can analysed and the bar code be decoded.

When a bar code is to be read, it may be oriented in an arbitrary direction. To read this bar code, the scanning pattern has to be designed such that, at least, one of its scanning lines passes over this bar code. The pattern, therefore, has to be effective over various directions and a multiple-directional scanning pattern is desirable.

In most multiple-directional scanners, a rotation mirror or an array of mirrors (polygon) is used to produce scanning lines. These lines are further separated and projected by auxiliary mirrors to form the multiple-directional scanning pattern.

2. Description of the Prior Art

A typical scanning scanner with a single rotating mirror has been described in U.S. Pat. No. 4,699,447. In this scanner, a set of mirrors surround this rotating mirror. The laser beam, incident on the rotating mirror, is directed to these mirrors. Reflecting from them, it scans the bar code and projects a multiple-directional pattern on it. The number of the scanning lines with various orientations depends on the number of these mirrors and their orientations.

Instead of a single mirror, a rotation polygon can also be used. In a typical scanner, described in U.S. Pat. No. 4,797,551, the laser is reflected by the facets of this polygon to a set of mirrors, surrounding this polygon. Reflected by them, a multiple-directional scanning pattern is projected onto the bar code.

However, the dimension and distribution of the scanning lines (scanning pattern), generated by the above-mentioned scanners, are changed at different reading distances. Therefore, the opportunity of reading bar codes may only be optimal over a restricted longitudinal working range. For instance, in a plane the scanning pattern may be star-like around a symmetrical axis, while in any other plane the scanning lines will be shifted away from this axis. In the area around this axis no bar code can be read.

Various scanning systems have been devised for use in producing line and frame scans for television operation, for example GB 1273176 and 2048606 and generally such systems use two motors, one for the line scan and one for the frame scan.

Systems for other purposes, in particular

GB 1 145 436 for recording information such as on a thermoplastic record medium;

GB 1 541 214 for heating a work piece such as in welding thin plastics film in making bags;

U.S. Pat. No. 4,838,632 for two dimensional digital film recording; and

U.S. Pat. No. 4,941,739 for provision of a mirror scanning system for use in a robotic manipulator, generally also use two or more motors.

Finally, PCT application WO 92/09133 discloses a bar code scanner where a mirror is mounted on a spring platform and oscillates in a short arc about three axes so that a form of varying star pattern is produced.

Such a system is costly to make and difficult to control.

SUMMARY OF THE INVENTION

The invention seeks to overcome the problems of the prior art and to provide a bar code scanner which is particularly suited to bar code scanning, which uses few components, is relatively inexpensive to manufacture and which can be easily controlled.

Accordingly the invention provides a scanning device for use in a bar code reader comprising:

a rotary drive motor for provision of a rotational drive, a drive shaft arranged to be driven by said rotary drive motor so as to rotate about an axis of rotation, a rotary carrier for provision of a rotary motion by being mounted axially for rotation about said drive shaft axis of rotation and connected to be driven by said drive shaft, mirror means carried by said carrier and pivoted for angular movement about a scan axis intersecting said drive shaft axis of rotation substantially at right angles thereto so as to provide a line scan of a bar code and force applying means which is arranged to apply a turning couple to said mirror means to cause said mirror to turn about said scan axis to provide said line scan while orientation of the line scan is caused to change due to rotation of the rotary carrier about said drive shaft axis of rotation.

By use of a rotary drive motor in combination with a driven rotary carrier, and providing the mirror means to be pivoted about a scan axis substantially at right angles to the rotary drive axis, a particularly simple arrangement can be provided which uses few components, can be readily set up and is particularly suited to bar code operators. More particularly only a single rotary drive motor needs to be used and the secondary motion for scanning can be provided either by coupling with the rotary scan motion, or by use of an axial electro-magnetic oscillating or vibrating drive.

Various embodiments of scanning devices in the present invention are presented and essentially there are two types.

In the first a coupling means derives the drive for the mirror and in the second an axial electro-magnetic coil provides the drive.

In the first, while directly driven by the drive motor, the mirror rotates about the rotational axis to provide a continuously varying orientation. To swing the mirror around the scan axis, a coupling device is used. This coupling device can have, at least, one permanent magnet, fixed to the mirror with its poles displaced from the scanning axis. Facing this magnet, this device can have a ring-shaped stationary track, along which the permanent magnets are arranged with alternative magnetic directions. In other words, the north and south poles of the magnets alternately appear on the track. During rotation around the orientation axis, the magnet or magnets on the mirror pass over the alternative poles of the magnets on the track. Under the repulsive and attractive force between them, the mirror swings about the scanning axis.

Instead of the coupling device, a coil, surrounding the rotary drive axis and a mirror carrying is a magnet, can be used. By feeding alternating current into this coil, the mirror is driven by alternating electro-magnetic force to swing about the scanning axis.

When the mirror is connected to the rotation shaft of the driver utilising elastic components, the mirror vibrates with a natural frequency. When the conditions of resonance are met, the largest swing angle of the mirror with the lowest power consumption is achieved.

Because of the swing motion of the mirror, the linear scanning speed of the scan spot varies considerably. At the extremes of the scanning lines, the linear speed vanishes. It leads to the decrease of the effective scanning field. The large variation in scanning speed also leads to the un-convenient increase of the bandwidth of scan electronics.

In order to overcome these problems, a further embodiment is presented here, in which a rotating polygon having a number of reflective facets, that is a rotary multi-facet mirror surrounding its rotation axis, is used.

The polygon can be assembled to a frame such that it rotates around its symmetrical axis, i.e. the scanning axis. Driven directly by the motor, the frame with the polygon rotates around the orientation axis. To rotate the polygon around the scanning axis, a coupling device is used. It may consist of a wheel which rotates around the scanning axis together with the polygon, and, facing it, a stationary ring-shaped track. When the frame is rotating around the orientation axis, the wheel is running along the track. By the mechanical or magnetic force between the wheel and track, the wheel rotates around the scanning axis. Thus, this embodiment also uses a coupling device coupling motion of the rotary carrier to also provide the movement about the scan axis.

Because of the simultaneous rotations around the two axes, the scan lines will be curved in the two embodiments. This curvature depends on the rotation speed around them. When the speed around the scanning axis is fast, as compared with that around the orientation axis, nearly straight scanning lines can be produced.

The above-mentioned devices can be used in a bar code reader. The beam, focused on to a bar code, is incident on the reflective optical component in the scanning device that rotates around two othorgonal axes. Reflected by it, this beam scans a two-dimensional pattern upon the bar code. The light, scattering from this bar code will be collected by the light collector to the sensor, by which the light signal is transferred to the electric signal and, then, decoded.

DESCRIPTION OF THE DRAWING

FIGS. 2a, 2b, 2c and 2d show four schematic views of how the FIG. 1a scan is re-orientated;

FIGS. 3a, 3b and 3c show schematic views of how the FIG. 1b scan is re-orientated;

FIGS. 5a, 5b and 5c are schematic diagrams of a second embodiment scanner which using an electro-magnetic axial vibrator;

FIGS. 7, 8, 9, 10a and 10b show diagrams illustrating various peripheral coupling systems for the third embodiment;

FIGS. 11a and 11b show the first embodiment in use as a bar code scanner;

FIGS. 12a and 12b show the third embodiment, which is a multi facet mirrored scanner, in use as a bar code scanner;

FIG. 19 shows a perspective view of an tenth embodiment using a spiral restorative leaf spring;

FIGS. 20a and 20b show perspective views of embodiments with modified coil placements.

FIGS. 21a and 21b show perspective views of an eleventh embodiment using the FIG. 18 scanner with two mirrors.

To understand the generation of the space-invariant multiple-directional scanning pattern, we first explain the formation of the scanning lines.

Figure 1A:
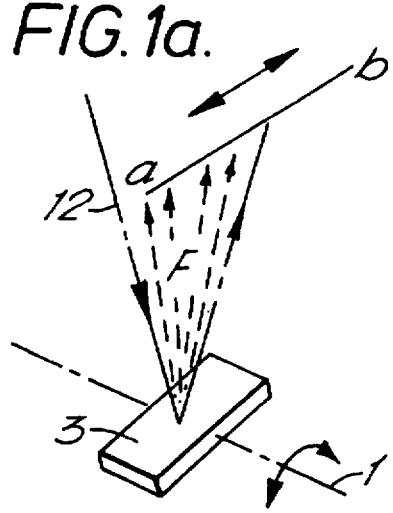
FIGS. 1a and 1b show schematic views of two ways of obtaining a bar code scan.

As shown in FIG. 1a, when the light beam 12 is incident on the mirror 3 that swings around the scanning axis 1, the scanning light, reflected from this mirror to the various directions, will forms a scanning fan, F, and the light spot on the observation plane moves to and fro along the line a–b, according to the swing direction. The length a–b depends on the swing angle of the mirror. At their extremes, a and b, the moving speed vanishes. The scanning pattern can be looked at as a number of scanning lines between their extremes.

Figure 1B:
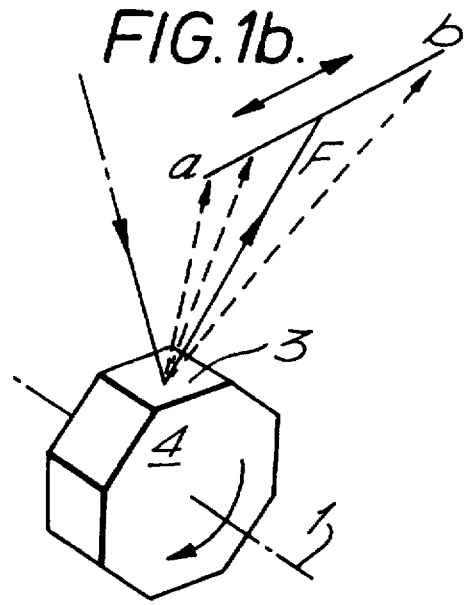

When this beam 12 is incident on the facet 3 of the polygon 4, that rotates around the scanning axis 1, it scans a fan F and, in the observation plane, the light spot moves along the line a–b according to the rotating direction, with its length, dependant on the rotation angle for a facet (FIG. 1b). The scanning pattern is formed by a number of line segments, corresponding to the facets.

Only in the case that the incident beam is normal to the scanning axis, to which the mirror is parallel, the scanning fan is planar and the line is straight.

As shown in FIG. 1b to generate a space-invariant scan pattern, the oscillation axis 1 rotates continuously around the rotation axis 2, which is perpendicular to the oscillation axis. Combining the rotation and oscillation around the two orthogonal axes, the multiple-directional or multiple-circular scanning pattern is produced.

Figure 2A:
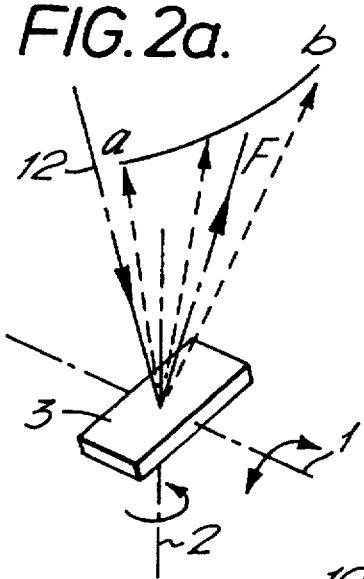
Figure 2B:
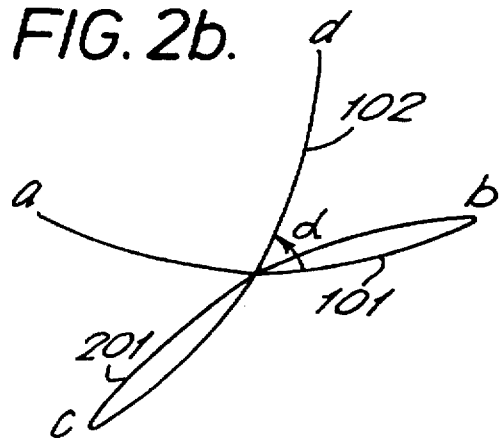
Figure 2C:
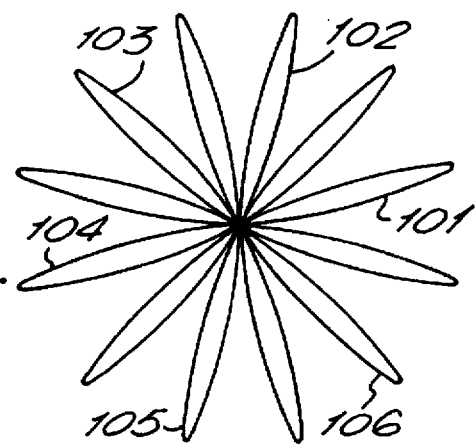

FIG. 2a shows the scanning geometry, in which a mirror swings or oscillates about the scanning axis 1 and rotates around the orientation axis 2. As shown in FIG. 2b, when a scanning line, say the line 101 from a to b, corresponding to the positive swing direction, is completed, the mirror will swing in the opposite (negative) direction. Only after competing the scan line, 201 from b to c, for the negative swing, the following positive line 102 from c to d starts. The positive scanning line 102 is then delayed because of the negative swing. During this time delay, the scanning axis is rotated by a certain angle, α, around the orientation axis and then, the following positive scan line 102 is then orientated at another direction. For various scanning lines, the directions are different due to the different time delays, the multiple-directional scanning pattern is then generated. FIG. 2c shows the scanning pattern corresponds to the scanning geometry with a swing frequency around the scanning axis, which is 6 times higher than that for the rotation around the orientation axis. In this pattern, the lines 101, 102, . . . , 106 correspond to one of the swing directions and the rest, to the other swing direction.

Because of the combination of the two rotations, scanning fan F and, in turn, the scanning line a–b is curved. When the swing speed of the mirror 3 around the scanning axis 1 is much higher than the rotation speed of the driver, the scanning pattern can be approximately consisted of multiple-directional straight scanning lines.

When the oscillation speed is very high, as compared with that for the rotation, the multiple-directional scanning pattern will be generated. As shown in FIG. 2c, when a scanning line, say the line 101 from a to b, corresponding to the positive swing direction, is completed, the mirror will swing in the opposite (negative) direction. Only after completing the scan line, 201 from b to c, for the negative swing, the following positive line 102 from c to d starts. The positive scanning line 102 is then delayed because of the negative swing. During this time delay, the oscillation axis is rotated by a small angle around the rotation axis and then, the following positive scan line 102 is then orientated at another direction. For various scanning lines, the directions are different due to the different time delay, the multiple-directional scanning pattern is then generated. In this pattern, the line 101, 102, . . . , 106 correspond to one of two opposite oscillation directions and the rest, another direction.

Also because of the combination of the two movements, scanning fan F and, in turn, the scanning line a–b is curved. When the oscillation speed of the mirror 3 is much higher than the rotation speed, the scanning pattern can be approximately consisted of multiple-directional 'straight' scanning lines.

To generate a star-like multiple-directional pattern, it is most preferred that the symmetrical axes of the scanning fans are in the immediate vicinity of a common axis. In this case, the scanning pattern has a symmetrical centre, which appears around the mid-points of the scanning lines. This common axis is then chosen as the rotation axis of the motor.

When the rotation speed is very high, as compared with that for oscillation, the multiple-circular scanning pattern will be produced. As shown in FIG. 2d, when a single circle from a to b is completed during a full rotation of the mirror, these two points are shifted from each other. To decrease the distance between these two points such that it can cover full circular bar code, the oscillation speed should be low enough.

FIG. 3a shows a scanning device having a polygon 4 rotating around two orthogonal axes. The pattern, shown here, is generated by a scanner having a polygon which has 6 facets with rotation speed around the scanning axis being two times higher than that around the orientation axis. As seen in FIG. 3b, after completing a single scan line 101 from a to b, the incident beam will go to the following facet. Compared with the start point c of the new scanning line 102 with the point a for the previous line 101, there is a time delay between them, equal to the time needed to complete the line 101. During this delay, the axis 1, in turn the line 102 rotates a certain angle, α. With multiple-faced polygon, the time delay between the scanning lines leads to the different orientations. The multiple-directional scanning pattern is, consequently, generated (FIG. 3c).

To generate a star-like multiple-directional pattern, it is most preferred that the symmetrical axes of the scanning fans are in the immediate vicinity of a common axis. In this case, the scanning pattern has a symmetrical centre, which appears around the mid-points of the scanning lines. And this axis is chosen as the orientation axis.

Again because of the combination of two rotations, the scanning line in the observation plane will be curved. When the rotation speed around the scanning axis is much higher than that around the orientation, the scan line can be approximated as 'straight'.

As seen from FIG. 2c, the scanning locus is continuous for the scanner with a swing mirror. In contrast to this, the scanning locus generated by a polygon is discontinuous (FIG. 3c).

According to the mentioned principles, we present a number of embodiments in the present invention to drive the optical means to rotate around two orthogonal axes and, further to generate multiple-directional patterns.

1, The First Embodiment

Figure 4A:
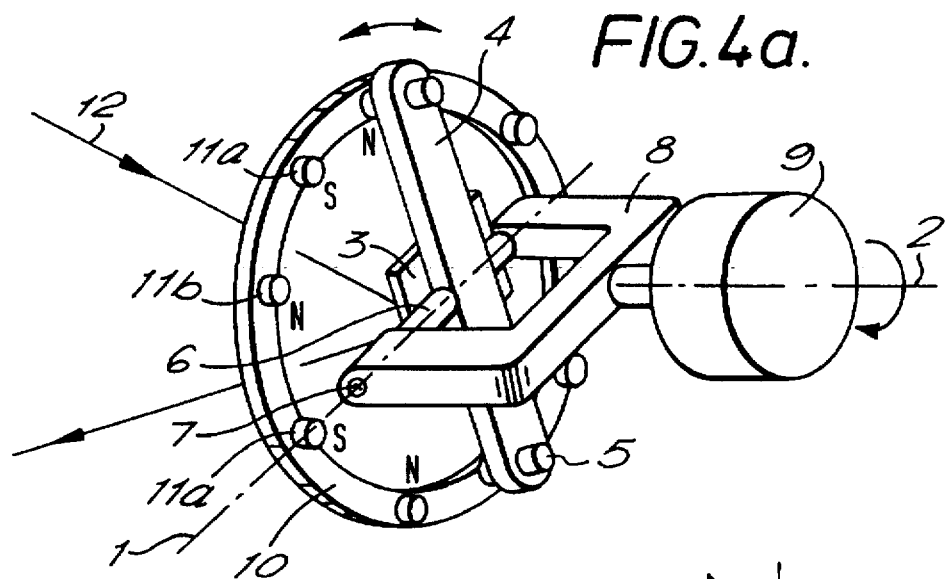
FIGS. 4a and 4b are schematic diagrams of a first embodiment of a scanner with peripheral magnetic coupling.

The first embodiment to generate the multiple-directional scanning pattern is shown in FIG. 4a. Around the scanning axis 1, and the orientation axis 2, the optical reflective mirror 3 rotates.

Figure 4B:
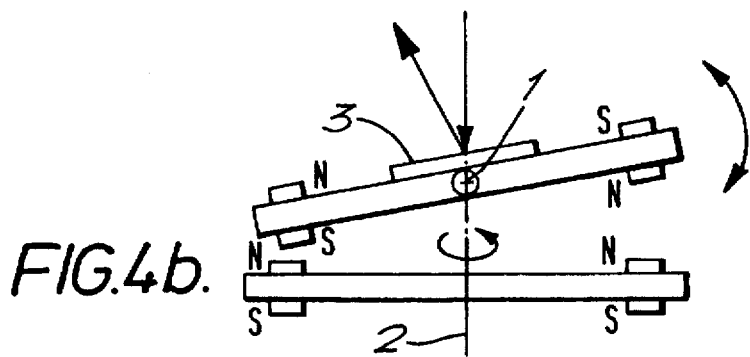

The mirror 3 is fixed to the substrate 4 together with, at least, one permanent magnet 5. This substrate has a shaft 6, mounted in the bearings 7 via which together with the mirror 3, it is mounted to the frame 8. This frame is directly driven by the motor 9 to rotate around the orientation axis 2. Facing the circular rotation locus of the magnet 5, a stationary rack 10 is situated. Upon this rack, a set of permanent magnets are arranged such that any two neighbouring magnets have opposite polarities 11a and 11b. For instance, a north pole, say 11b in this drawing, is always neighboured by two south poles, 11a. When the frame 8 is rotating around the orientation axis 2, the magnet 5 is passing over the alternative poles of the permanent magnets, 11a and 11b. Under the repulsive and attractive magnetic force between them, the mirror will swing around the scanning axis 1 (see FIG. 4b).

As shown in FIG. 5a, instead of the track 10 with magnets 11 in the coupling means of two rotations, a single coil 13 can be used for driving the mirror to swing around the scanning axis during its rotation around the orientation axis. As seen in FIG. 5b, upon the substrate 4 for the mirror 3, two permanent magnets, 5a and 5b, are fixed with opposite polarities. Feeding alternative current to this coil, the alternative electro-magnetic field is produced in this coil. Since the magnets 5a and 5b having opposite polarities, under this alternative electro-magnetic field, the mirror 3 will swing or oscillate around the scanning axis, 1.

The two permanent magnets 5a and 5b can be replaced by a single magnet 5, whose magnetic field is normal or tilted from that generated by the coil. Applying alternating current to this coil, this magnet with the mirror will be re-orientated such that the mirror swings about the scanning axis.

The shaft 6 and the bearing 7 in this embodiment can be replaced by the elastic components, such as torsion bars, by which the substrate 4 is directly connected to the frame. When the frame is rotated under the electro-magnetic driving force, the elastic force, arising from the strain (distortion) of the elastic components, will pull it back. In the case of resonance, the oscillatory swing about the first axis achieves its maximum amplitude.

When the incident light is along the orientation axis 2 and the mirror 3 swings symmetrically about this axis, the scan pattern in any plane, normal to this axis, will be star-like and space-invariant.

2, The Second Embodiment

Figure 6:
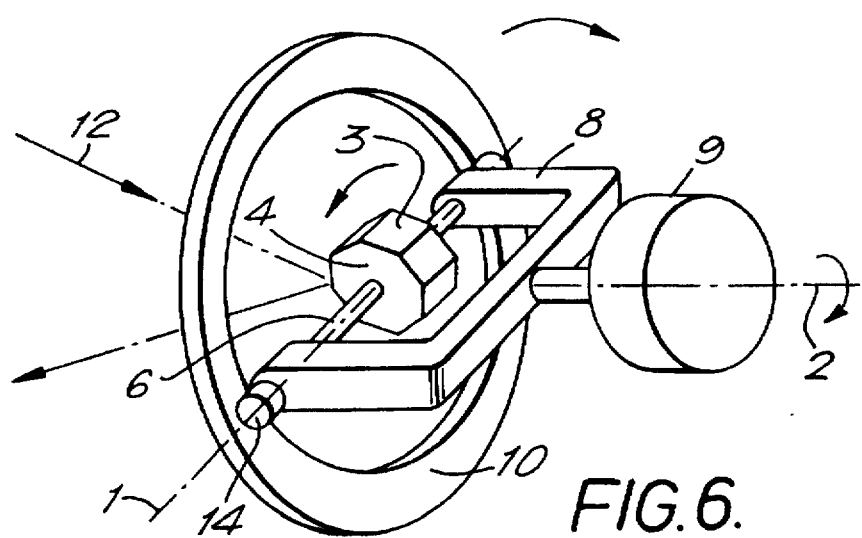
FIG. 6 shows a perspective view of a third embodiment which is a multi facet mirrored scanner.

As shown in FIG. 6, in the second embodiment, a rotating polygon 4 having a number of facets 3, surrounding the shaft 6, is used. By means of the shaft, 6, and bearing (not shown), this polygon is mounted to the frame 8 such that it can rotate around the scanning axis 1. The facets in polygon 4 are substantially parallel to this axis. The frame 8, driven by motor 9, rotates around the orientation axis, 2.

To drive the polygon 4 to rotate around the scanning axis, 1, a coupling device is used. It comprises a wheel 14 and, facing to its moving locus around the orientation axis, a stationary ring-shaped track 10. The wheel rotates together with the polygon around the scanning axis 1. When the frame 8 is rotating about the scanning axis 2, the wheel 14 is running along this track 10. The wheel 14 and the track 10 are coupled together such that during running the wheel rotates around the scanning axis 1.

When the incident beam 12 is reflected by facets of polygon, which rotates around two rotation axes 1 and 2, normal to each other, a two-dimensional scan pattern is then generated.

When the rotation speed around the scanning axis is much higher than that around the orientation axis, straighter scanning lines can be obtained. The diameter of the wheel is, then, expected to be much smaller than that for the track.

To generate a space-invariant star-like pattern, the incident beam is arranged to be along the orientation axis and the reflected scanning fans from facets are most preferred to be symmetrical around the same axis.

We further discuss the coupling between the wheel and the track.

As shown in FIG. 7, when the wheel 14 runs along the track 10, the wheel can rotate because of a friction coupling. However, the wheel 14 touches the track 10 and, furthermore, to generate sufficient friction force, which is enough to rotate the wheel, a pressure force between them is needed. This force leads to wear of the wheel, the track and bearings. Their life time, therefore, will be restricted.

The wheel and track can be coupled by toothed gearing. A shown in FIG. 8, when the gear (wheel) 14 runs along the track 14, the spur teeth on the wheel and track will cause the wheel to rotate. The coupling by toothed gearing may lead to noise and the gears may also be worn.

To rotate the wheel without touching the track, permanent magnets can be used. As shown in FIG. 9, upon the wheel permanent magnets are fixed such that their poles along the outer round side of this wheel have alternative polarities, 15a and 15b. The permanent magnets are also installed on the track 10 with their poles with alternative polarities 16a and 16b, facing to the wheel. The distance between the neighbouring permanent magnets on the wheel and track is identical. When the magnetic wheel, 14, runs along the magnetic track 14, the attractive magnetic force between them will cause the wheel to rotate.

This coupling is similar to the coupling by spur gears. However, since the wheel does not touch the track, insignificant noise and wear between them occurs.

However, the attraction force between the wheel and track will produce a rise in torque against the bearings. It may then lead to additional wear of the bearings. To cancel this torque, the permanent magnets on the wheel 14 are arranged, such that their poles appear on the disc sides with alternative polarities (FIG. 10a). The magnetic wheel runs between two concentric rings 18a and 18b on the track 10, along which two sets of permanent magnets 16 and 17 are fixed with alternative polarities a and b. The magnets on the two rings are matched to each other, such that, as shown in FIG. 10b, the attractive forces between the magnets in set 15 and 16, as well as 15 and 17 are substantially cancelled from each other.

When the magnetic wheel, 14, runs in the groove 19 between the two magnetic rings, it will rotate under the axial attractive force between magnets on the wheel and track. Since the attractive forces are in the opposite directions, the resultant force becomes zero and the bearings in frame 8 suffer substantially no additional magnetic torque and axial force.

3. Bar Code Readers with the First Embodiment

FIG. 11a shows a bar code reader in which a scanning device, based upon the first embodiment is used.

In order to project a perfect space-invariant multiple-directional pattern onto a bar code reading plane around a chosen axis (the orientation axis), the symmetrical axis of swing for the mirror is preferred to be coincident with this axis and the incident beam is preferred to be incident along it. However, in this case, the reflected beam will be coincident with incident light to the light source itself. Hindered by this source and its wires, the scanning lines, therefore, may be broken and no bar code can be read then. To separate these two beams to obtain full scanning length, half mirrors can be used. However, it leads to a decrease of light efficiency.

In the present invention, the reflective optical means may consist of two mirrors 3a and 3b, facing each other along the scanning axis 1, and tilted by 45° with respect to it. As shown in FIG. 11b, the light beam, 12, incident along the orientation rotation axis 2 on the one of the mirrors, say 3a, will be reflected by it to the mirror 3b, from which it is directed to the bar code. When the mirrors together rotate about the orientation axis 2, a blind zone around this axis, where no bar code can be read, occurs. If the distance, p, between these two incident points on the mirror 3a and 3b is chosen such that a small central mirror can be placed to reflect the incident thin beam to the direction along the second axis, this blind zone will then depend on the diameter of the small mirror. When this mirror is not too large, as compared with the size of the bar code, the decrease in the reading opportunity is very little.

The scan beam from the source 21, such as a laser diode, is focused by the focusing optics 22 to the space in which the bar code 23 is placed. Through the small opening 24 of the light collector 25, this focused thin beam is directed to the small central mirror 26, fixed on the window 27. Reflected by this mirror, the beam is incident on the polygon 3a along the second rotation axis 2. Reflected by the mirror 3a and 3b, which swings around the scanning axis 1 and rotates around the orientation axis 2 simultaneously, the multiple-directions pattern 28 is then projected upon the bar code.

The light, scattering by the bar code, is reflected by the swing and central mirrors and then collected by the light collector 25 to the photo-sensor 29. The diameter of the central mirror 26 is smaller than 2b but large enough to reflect a thin beam or collect sufficient scattering light. The light signal is then transferred via the sensor 29 into an electric signal. Following recognition by the decoding electronics, the bar code signal is decoded.

4. Bar Code Readers with the Second Embodiment

FIG. 12a shows a bar code reader in which a scan device, based upon the second embodiment is used.

To separate the reflected beam from the incident beam, the polygon in the present invention consists of two identical parts, 3a and 3b. As shown in FIG. 12b, their facets, 4a and 4b, facing each other along the scanning rotation axis, are tilted by ±45° with respect to it. When the light 12 is incident along the orientation axis on, say, the polygon 3a, it will be reflected by the facet 4a to the facet 4b of the polygon 3b, from which it is directed to the bar code. When the distance p between these two incident points on the facets 4a and 4b is small, the blind zone has little influence on the reading opportunity.

The scan beam from the source 21, such as a laser diode, is focused by the focusing optics 22 to the space, in which a bar code 23 is placed. Through the small opening 24 of the light collector 25, the focused beam is directed to the small central mirror 26, fixed on the window 27. Reflected by this mirror, the beam is incident on the polygon 3a along the orientation axis 2. Reflected by the facets 4a and 4b of the polygon 3a and 3b, which rotates around the axis 1 and 2 simultaneously, the multiple-directions pattern 28 is projected upon the bar code.

The light, scattering by the bar code, is reflected by the facets of the polygon and the central mirror and then collected by the light collector 25 to the photo-sensor 29. The light signal is then transferred into an electric signal that can be decoded by decoding electronics.

We now further present the details of the scanning devices.

2-1 The Fourth Embodiment

Figure 13:
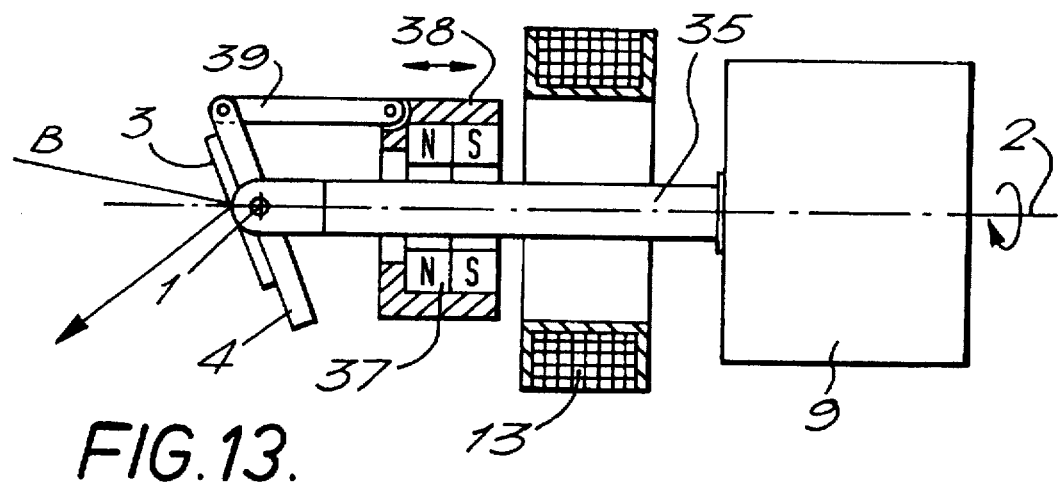
FIG. 13 shows a part sectional side view of fourth embodiment based on use of an axial electro magnetic coil.

FIG. 13 shows the fourth embodiment of the scanning device. In this device, the light beam B is incident on the mirror 3, which is fixed to the frame 4. By means of a non-elastic supporting means, this mirror with frame is mounted to the rotation shaft 35 of the motor 9. During rotation of the motor 9, the mirror rotates around the rotation axis 2. The permanent magnetic ring 37 is placed in the housing 38, though which the shaft 35 passes. The housing 38 with the magnetic ring 37 can move to and fro along the shaft 35.

The supporting means can be a shaft-bearing unit, which also surrounding the oscillation axis 1, around which the mirror 3 swings (not shown in this figure). The shaft is fixed to this mirror and forms an oscillation axis for it, while the bearing or bearings is fixed to the rotation frame. Alternatively, the bearing or bearings is fixed to the mirror, while the shaft is fixed to the frame.

The frame 4 and housing 38 are connected by the draw bar 39. The coil 13, into which the alternative current is fed to generate electro-magnetic field, surrounds the shaft 35, and faces the magnetic ring 37. Driven by the alternating magnetic force from the coil 13, the magnetic ring 37 together with the housing 38 will move to and from, and the mirror 3 then swings.

Because of the larger mass of the magnetic ring and its housing as well as draw bar, this device is most likely to be used for low speed oscillation.

We also provide scanning devices, in which an elastic supporting means is used. With this, the mirror vibrates. When the resonant condition is met, the oscillation reaches its maximum amplitude with the minimum power consumption.

2-3 The Fifth Embodiment

Figure 14:
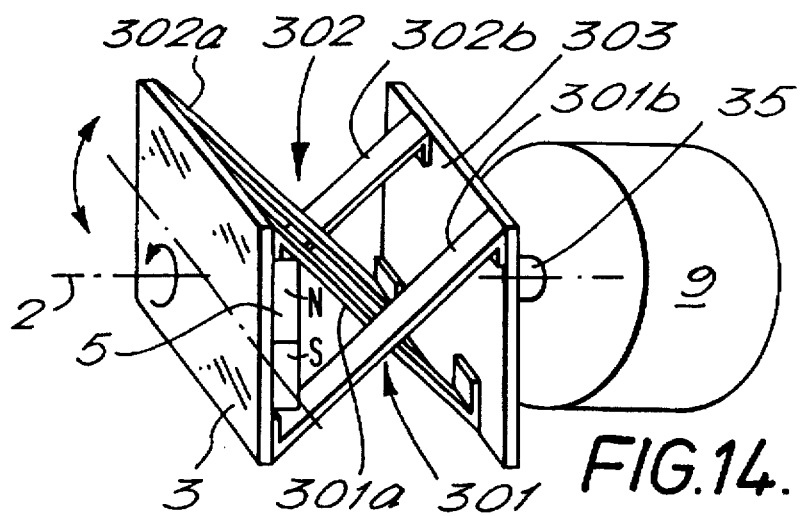
FIG. 14 shows a side view of a fifth embodiment using leaf spring suspension.

In FIG. 14, two pivots 301 and 302 are used to connect the mirror 3 to the frame 303, which is fixed to the rotation shaft 35 of the motor 9. Each pivot is comprised of two leaf springs, 301a and 301b as well as 302a and 302b. These pivots define the oscillation axis for the mirror 3, perpendicular to the rotation axis of the motor 9. Behind the mirror 3, the permanent magnet 5 is fixed with its field, normal to the oscillation axis. Under the alternative electro-magnetic field, generated by the coil (not shown in this figure), the mirror 3 will vibrate.

Figure 15:
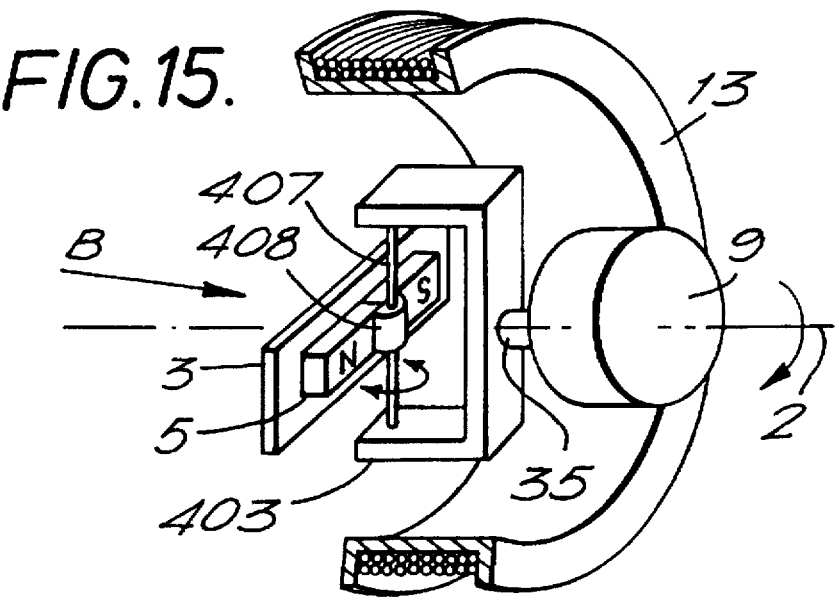
FIG. 15 shows a side view of a sixth embodiment using tension bar suspension.

A torsional suspension spring is used in a sixth embodiment to suspend the mirror. As shown in FIG. 15, the mirror 3, magnet 5 and the holder 408 of torsion bar are fixed together. The torsional bar 407 is fixed to the rotation frame 403 and by the holder 408, to the mirror 3. The frame 403 is fixed to the rotation shaft 35 of the motor 9. The torsional bar 407 is normal to the rotation axis 2 of the motor 9 and it defines the oscillation axis 1 of the mirror.

The magnetic field from the magnet 5 is normal to the torsion bar. Under the alternating electro-magnetic field, generated by the coil 13, the mirror 3 will vibrate.

Instead of this torsional bar, a cylindrical or leaf spring can also be used.

2-3 The Seventh Embodiment

Figure 16:
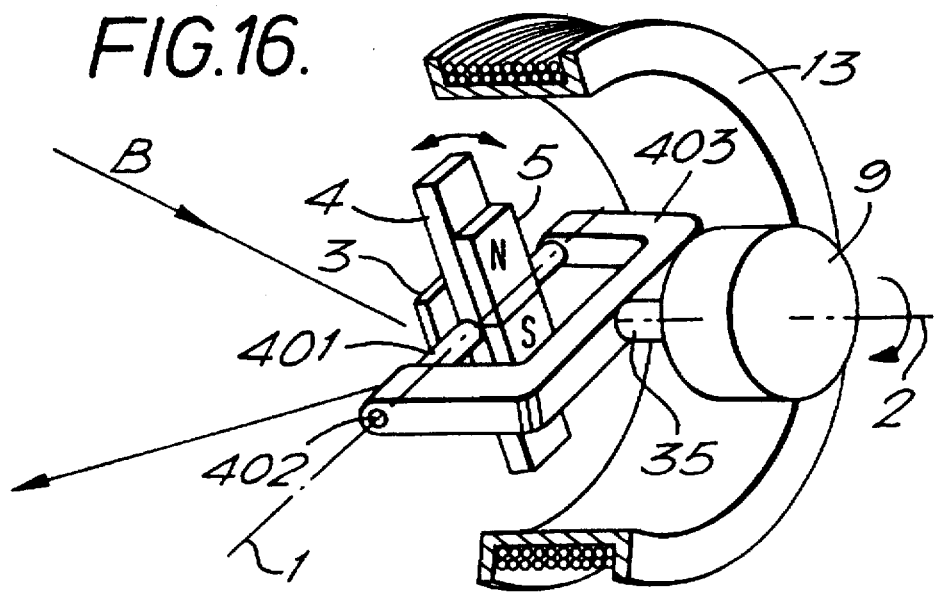
FIG. 16 shows a perspective view of an seventh embodiment.

The seventh embodiment of the present invention is a modification of the scanning geometry in FIG. 5. This geometry is re-drawn in FIG. 16 with a single magnet with its field parallel to the mirror plane.

As shown in this figure, upon the substrate 4, the mirror 3 and the permanent magnet 5 are assembled together to form the oscillating unit. By means of the non-elastic supporting means, this unit is mounted to the frame 403. The supporting means here can be a shaft-bearing unit. For instance, the shaft 401 is fixed to the oscillation unit, while the corresponding bearings 402 are fixed to the frame 403. This support defines the oscillation axis 1 along the rotation axis of the shaft 301. The frame 403 is directly driven by the motor 9 to rotate around the rotation axis 2.

The poles of the permanent magnet(s) 5 are situated on the different sides of the oscillation axis. The coil 13, into which the alternative current is fed, surrounds the permanent magnet or magnets. Under the alternative rotation-independent turning torque, applied to the magnet 5, the mirror 3 will oscillate accordingly. Combining the rotation, arising from the motor, and the oscillation, arising from the coil-magnet unit, of the mirror, the light beam B, reflected by this mirror, will scan a pattern, which can be multiple-directional or multiple-circular, depending on the difference in these two speeds.

Using the additional elastic elements, the supporting means will become elastic and the mirror can vibrate about the oscillation axis. When the frequency of the alternative current in the coil equals that for resonance, the oscillation amplitude arrives at its maximum and the power consumption is minimized.

Figure 17:
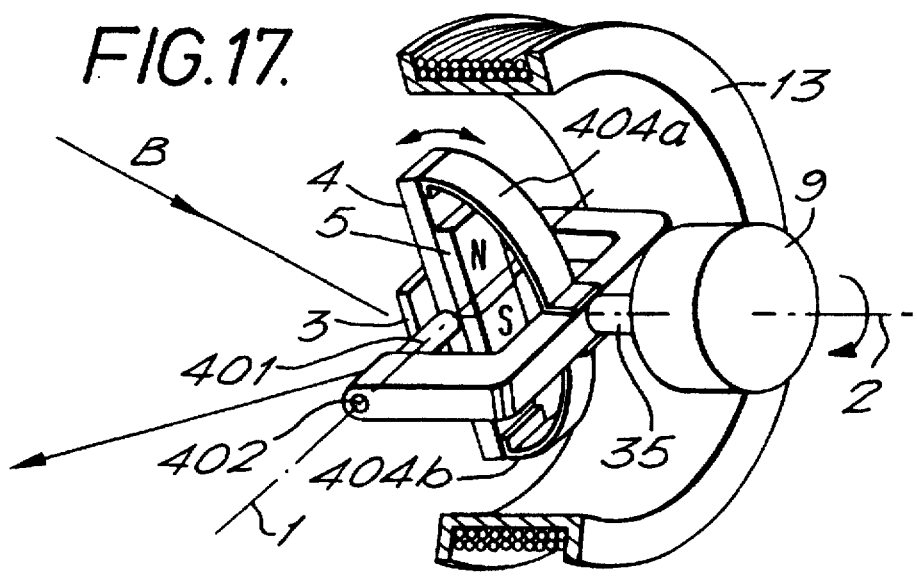
FIG. 17 shows a perspective view of an eighth embodiment using elastic restorative leaf springs.

The additional elastic components can be leaf springs. As shown in FIG. 17, by means of two springs, 404a and 404b, the oscillating part, containing the mirror 3 and substrate 4 and magnet 5, is connected to the frame 403. Any shift of the mirror from its equilibrium position will lead to a elastic force from the spring, pushing it back.

Figure 18:
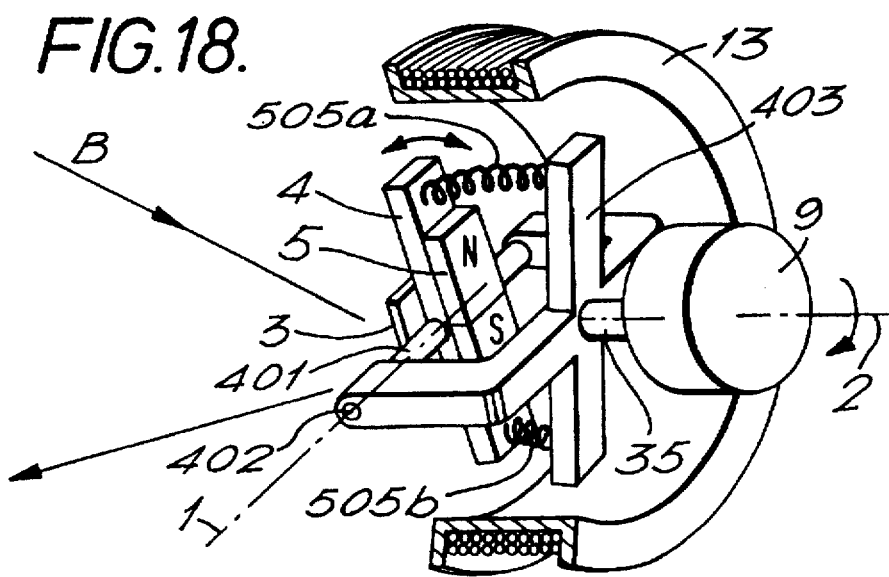
FIG. 18 shows a perspective view of a ninth embodiment using helical restorative springs.

FIG. 18 shows the device in which two helical cylindrical springs are used. The frame 403 is modified such that the substrate 4 is connected to it by the cylindrical springs 505a and 505b to form a vibration system.

A spiral leaf spring can also be used. As shown in FIG. 19, the one end of spring 406 is fixed to the shaft 401 and its other end, to the frame 403.

In the device of the fifth embodiment having a flexural pivot or pivots and those in the seventh embodiment, the permanent magnet, fixed to the mirror, is orientated such that its magnetic field is substantially normal to the field, produced by the coil. As shown in FIG. 20a, the coil 13 then surrounds this magnet 5, which is mounted to the rotation shaft 35 of the motor 9 by the support S.

To decrease the vibration mass, the mirror 3 may be replaced by an optical thin reflective film, deposited on the magnet 5.

Alternatively, the coil-magnet oscillation driving means can also be arranged such that at least one permanent magnet is fixed to the mirror with its magnetic field substantially parallel to the rotation axis and spaced from the oscillation axis. As shown in FIG. 20b, two permanent magnets 5a and 5b with opposite directions of polarity, substantially parallel to the rotation axis 2, are used. In this case, the coil 10 faces the magnets. Applying alternative current to the coil 13, the two magnets will be under the turning torque and the mirror 3 will swing around the oscillation axis 1, led by the support S.

Based upon the above mentioned devices that can rotate around one axis, and vibrate around another axis, various new types of bar code reader have been shown.

In order to project a space-invariant multiple-directional or multiple-circular pattern unto a bar code reading space, symmetrical around the rotation axis 2 of the motor 9, the mirror has to oscillate symmetrically around the same axis and the incident beam is most preferred to propagate along it. Otherwise, the scanning pattern will be distorted.

However, with this geometry, the beam may be reflected back along the incident path to the light source itself. Hindered by this source and its wires, the scanning lines, therefore, may be broken and no bar code can be read there. To separate these two beams to obtain complete continuous scanning line, a half mirror can be used. However, this leads to a decrease of the light efficiency.

In the eleventh embodiment of the invention, the reflective optical means consists of two mirrors 3a and 3b, facing each other along the oscillation axis 1, and tilted by ±45° with respect to it. As shown in FIG. 21a, the light, B, incident along the rotation axis 2 on the one of the mirrors, say 3a, will be reflected by it to the mirror 3b, from which it is directed to the bar code C. When the mirrors together rotates about the rotation axis 2, the blind zone around this axis, where no bar code can be read, occurs. The distance, p, between these two incident points on the mirror 3a and 3b is chosen such that a small central mirror 26 can be placed to reflect the thin incident beam back to the direction along the rotation axis. The blind zone then depends on the diameter of the small mirror. When this mirror is not large, as compared with the height of the bar code, the reading opportunity is actually not much decreased.

Instead of these two mirrors, a total reflection right-angled prism can also be used.

Using any of the above mentioned light deflection device, the light reflected by the deflection means in this device, the light beam can scan the multiple-directional or multiple-circular scanning pattern. FIG. 21b shows the bar code reader in which the device in FIG. 18 is used. The mirrors 3a and 3b vibrate together around the oscillation axis 1 and rotate around the rotation axis 2. The scan beam B from the source 21, such as laser diode, is focused by the focusing optics 22 to the space in which the bar code C is situated. Through the small opening 24 of the light collector 25, this focused thin beam is directed to the small central mirror 26, fixed on the window 27. Reflected by this mirror, the beam is incident on the polygon 3a along the rotation axis 2. Reflected by the mirror 3a and 3b, which swings around the scanning axis 1 and rotates around the orientation axis 2 simultaneously, the scanning pattern 28 is then projected upon the bar code C.

The light, scattering by the bar code C, is reflected by the oscillating and central mirrors, 3a 3b and 26 and then collected by the light collector 25 to the photo-sensor 29. The diameter of the central mirror 26 is smaller than 2b but large enough to reflect thin beam or to collect sufficient scattering light. By the sensor 29, the light signal is then transferred as an electric signal. After recognition by the decoding electronics, the bar code signal is decoded.

Depending on the relative rotation speed of oscillation and rotation, the scanning pattern can be varied. When the oscillation speed is much faster than that for rotation, the light beam, incident on this deflective optical means, will be reflected to produce a multiple-directional pattern, while when the oscillation speed is much slower than that for the rotation, a concentric multiple-circular scanning pattern will be produced. To control this pattern, two control units, 41 and 42, in this scanner are used.

For the scanners, in which non-resonant supporting means is used, both control unit 41 and 42 are used separately to control speed. For resonant scanners, the unit 42 is most preferred to be used to adjust the frequency of the alternative current in the coil 13 to meet the resonant condition, while the unit 41 is used to control the scanning pattern.

I claim:

1. A scanning device for use in a bar code reader comprising:

a single rotary drive motor for provision of a rotational drive, a drive shaft arranged to be driven by said rotary drive motor so as to rotate about an axis of rotation, a rotary carrier for provision of a rotary motion by being mounted axially for rotation about said drive shaft axis of rotation and connected to be driven by said drive shaft, mirror means carried by said carrier and pivoted for angular movement about a scan axis intersecting said drive shaft axis of rotation substantially at right angles thereto so as to provide a line scan of a bar code and force applying means which is arranged to apply a turning couple to said mirror means to cause said mirror means to turn about said scan axis to provide said line scan while orientation of the line scan is caused to change due to rotation of the rotary carrier about said drive shaft axis of rotation.

2. A scanning device according to claim 1 in which the force applying means includes coupling means which couples rotary movement of the rotary carrier to the mirror means, so as to provide the turning couple for turning said mirror means about said scan axis.

3. A scanning device according to claim 1 in which said mirror means includes a magnet having at least one pole which is offset from the scan axis and magnetic force applying means which applies a force to said offset pole to provide said turning couple for turning said mirror means about said scan axis.

4. A scanning device according to claim 2 in which said deflection means includes a rotary multi-facet mirror and the coupling means is arranged to rotate the multi-facet mirror through being coupled via said rotary carrier to said drive shaft.

5. A scanning device according to claim 4 in which said coupling is a magnetic connection between the rotary multi-facet mirror and the rotary carrier.

6. A scanning device according to claim 2 in which said coupling means includes, disposed on said rotary carrier and around said drive shaft axis, force applying means for applying, in a direction parallel to said drive shaft, a series of deflection forces to said mirror means to provide the turning couple to the mirror means, as said drive shaft rotates.

7. A scanning device according to claim 6 in which the force which is arranged to be applied by said force applying means is a magnetic force.

8. A scanning device according to claim 5 in which said coupling means includes a plurality of magnets located in a peripheral path on said carrier, whereby on rotation said magnets cause said multi-facet mirror to rotate as said drive shaft rotates.

9. A scanning device according to claim 3 comprising an electro-magnetic coil surrounding said drive shaft axis and arranged to have an alternating current fed thereto for provision of the series of deflection forces to provide said turning couple to the mirror means as said drive shaft rotates.

10. A scanning device according to claim 9 in which spring means is provided between said mirror means and said rotary carrier for restoring said mirror means to an equilibrium position in opposition to said deflection forces applied by said electro-magnetic coil.

11. A scanning device for use in a bar code reader comprising a rotary drive motor for provision of a rotational drive, a drive shaft arranged to be driven by said rotary drive motor so as to rotate about an axis of rotation, a rotary carrier for provision of a rotary motion by being mounted axially for rotation about said drive shaft axis of rotation and connected to be driven by said drive shaft, mirror means carried by said carrier and pivoted for angular movement about a scan axis substantially at right angles to said drive shaft axis of rotation so as to provide a line scan of a bar code magnet means attached to said mirror means and an electro magnetic coil located axially of said drive shaft axis of rotation and arranged to have an alternating current applied there to so as to apply a varying turning couple to said mirror means to cause said mirror means to turn about said scan axis to provide said line scan while orientation of the line scan is caused to change due to rotation of the rotary carrier about said drive shaft axis of rotation.

12. A scanning device for use in a bar code reader comprising a rotary drive motor for provision of a rotational drive, a drive shaft arranged to be driven by said rotary drive motor so as to rotate about an axis of rotation, a rotary carrier for provision of a rotary motion by being mounted axially for rotation about said drive shaft axis of rotation and connected to be driven by said drive shaft, mirror means carried by said carrier and pivoted for angular movement about a scan axis substantially at right angles to said drive shaft axis of rotation so as to provide a line scan of a bar code and coupling means which couples motion of said rotary carrier with movement of said mirror means to cause said mirror means to turn about said scan axis to provide said line scan while orientation of the line scan is caused to change due to rotation of the rotary carrier about said drive shaft axis of rotation.

* * * * *